United States Patent [19]

McKee

[11] Patent Number: 4,860,899

[45] Date of Patent: Aug. 29, 1989

[54] MEDICATION CONTROL SYSTEM

[75] Inventor: John H. McKee, Dayton, Ohio

[73] Assignee: RNA, Incorporated, Engelwood, Ohio

[21] Appl. No.: 142,101

[22] Filed: Jan. 11, 1988

[51] Int. Cl.⁴ ............................................. B65D 83/04
[52] U.S. Cl. .................................... 206/534; 206/459; 206/390; 383/37; 383/66; 383/84
[58] Field of Search ............... 206/233, 390, 459, 528, 206/534, 532, 534.1; 383/5, 37, 61, 66, 84

[56] References Cited

U.S. PATENT DOCUMENTS

| | | | |
|---|---|---|---|
| 3,045,891 | 7/1962 | Alvarez | 383/37 |
| 3,117,608 | 1/1964 | Goss et al. | 206/459 |
| 3,255,871 | 6/1966 | Butler | 206/459 |
| 3,397,671 | 8/1968 | Hartman, Jr. et al. | 206/532 |
| 3,409,721 | 11/1968 | Applezweig | 206/532 |
| 3,432,951 | 3/1969 | Cherrin | 206/534 |
| 3,497,982 | 3/1970 | Schulz | 206/459 |
| 3,612,390 | 10/1971 | Howard | 206/610 |
| 3,619,395 | 11/1971 | Skendzic | 383/61 |
| 3,910,412 | 10/1975 | Vargo | 206/459 |
| 3,921,805 | 11/1975 | Compere | 206/532 |
| 3,955,750 | 5/1976 | Huffman | 206/232 |
| 4,121,714 | 10/1978 | Daly et al. | 206/459 |
| 4,128,954 | 12/1978 | White | 206/459 |
| 4,206,844 | 6/1980 | Thukamoto et al. | 206/459 |
| 4,240,848 | 12/1980 | Barker | 206/459 |
| 4,318,477 | 3/1982 | Kerpe | 206/534 |
| 4,416,375 | 11/1983 | Braverman et al. | 206/534.1 |
| 4,473,156 | 9/1984 | Martin | 206/534 |
| 4,483,018 | 11/1984 | Whelan | 383/5 |
| 4,509,196 | 4/1985 | Sak et al. | 383/676 |
| 4,526,404 | 7/1985 | Vazquez | 206/232 |
| 4,706,996 | 11/1987 | Fasham | 206/232 |
| 4,733,362 | 3/1988 | Haraguchi | 206/534 |

*Primary Examiner*—David T. Fidei
*Attorney, Agent, or Firm*—Biebel, French & Nauman

[57] ABSTRACT

The present invention discloses an apparatus and articles for use in dispensing medication. Control of the medication is accomplished by assigning unique numerical (or alpha-numerical) code identifications to each of the many medications prescribed for patient use. A typical dosage, usually a unit dosage, of each medication is placed in a sealed packet and each packet is marked with the code identification of the medication contained in the packet.

8 Claims, 4 Drawing Sheets

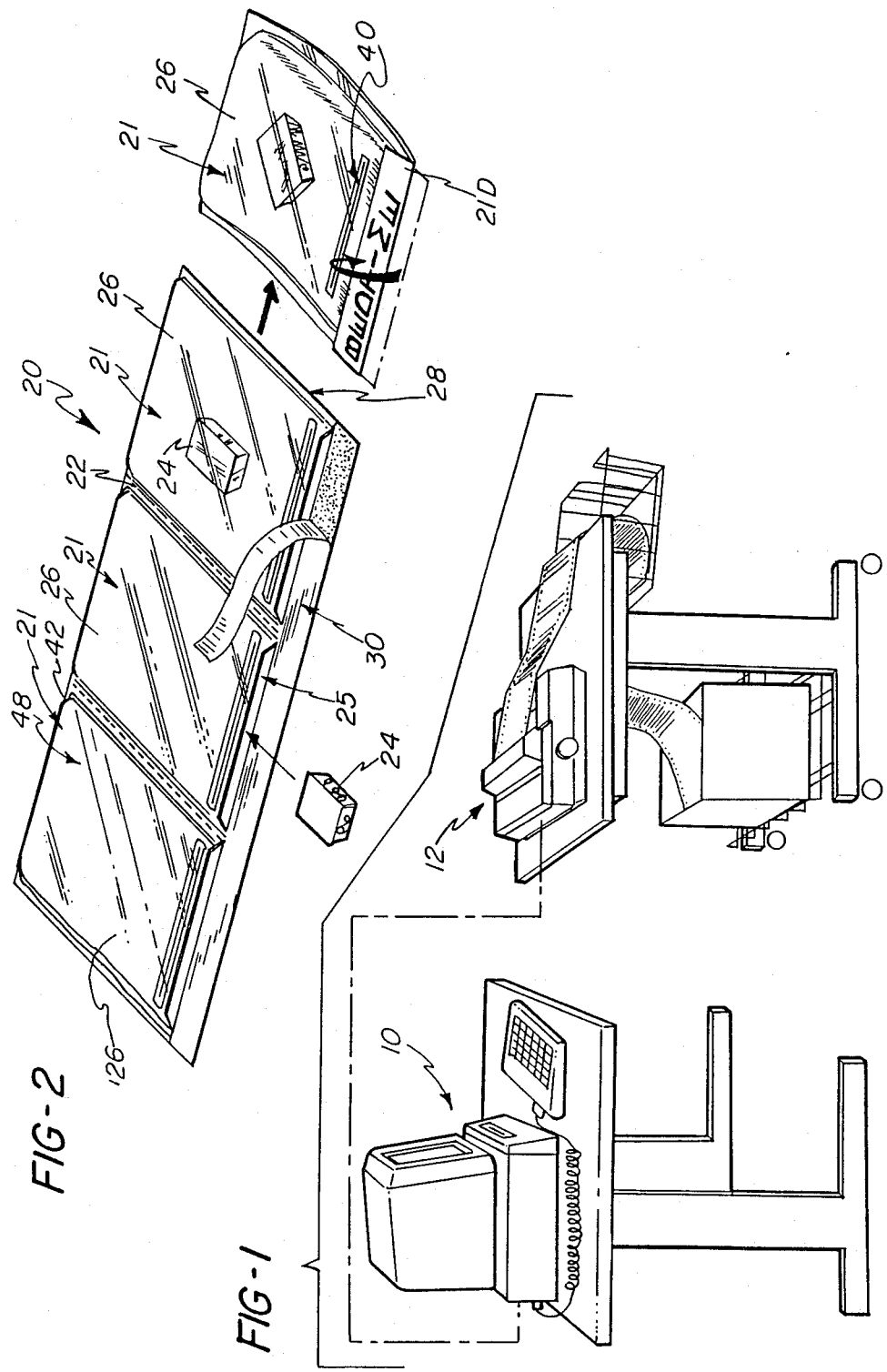

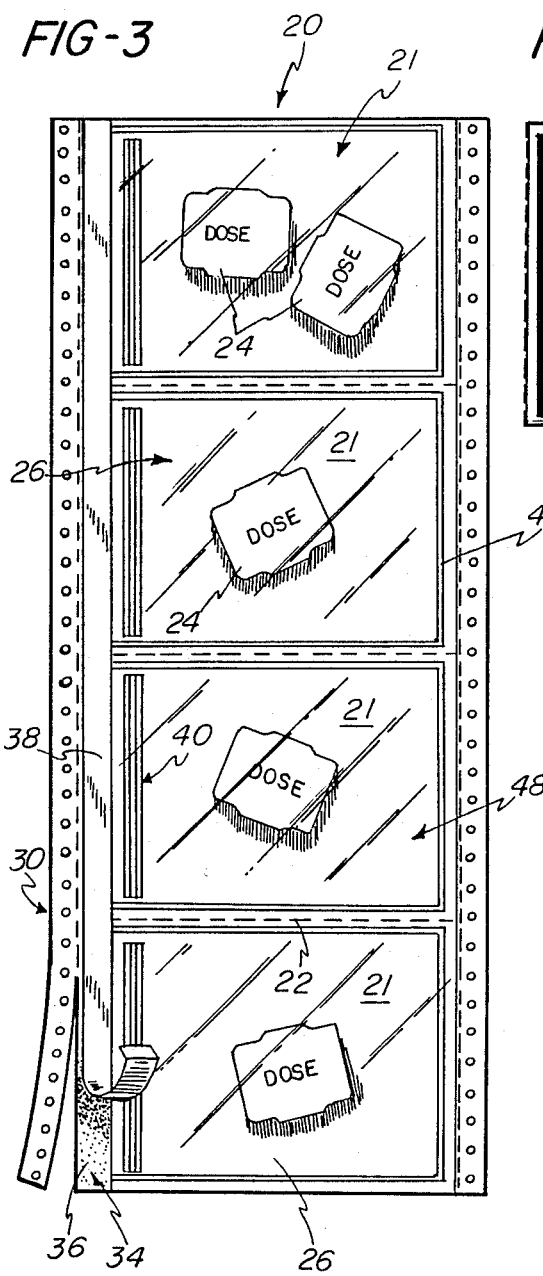
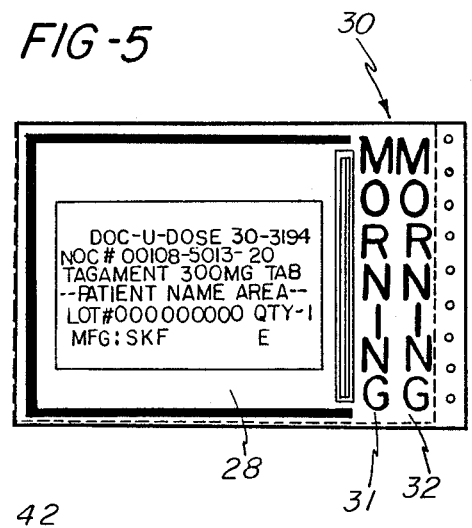
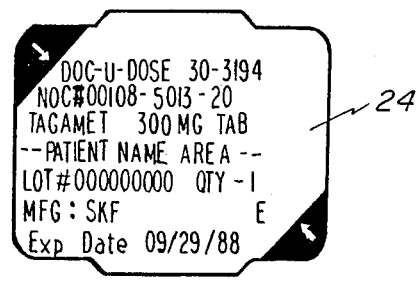
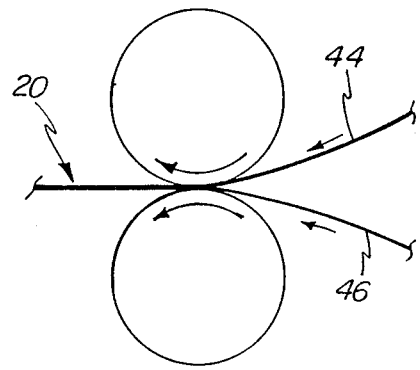

FIG-7

MEDICATION CONTROL SYSTEM

BACKGROUND OF THE INVENTION

The present invention relates to a control method for dispensing medication and, in particular, to a medicine dispensing system which dispenses medication in specific doses.

It is well known in the health care industry that misuse of prescribed drugs is a serious problem for persons who are easily confused, have short memories or are physically or mentally handicapped. The misuse of prescribed drugs is particularly evident among senior citizens.

In the United States thousands of persons die each year from failure to take medication at prescribed times or in proper dosages, from failure to follow other instructions relating to the medication, or from complications of side effects or adverse interaction of medications or drugs accidentaly or carelessly prescribed for and administered to the same patient.

The health needs of the elderly and handicapped present an increasingly important problem in our society. The majority of elderly and handicapped patients are cared for by families, friends and community-based institutions, none of which are adequately prepared for equipped to control medication regimens.

Drug administration in the care of the elderly and handicapped must be properly controlled, and careful records kept, in order to ensure that prescribed medicine is in fact meeting the health needs of the patients and not instead doing them harm. Because of the complex drug regimens of many elderly persons and some handicapped persons, drugs are often used improperly because of a lack of supervision or because of the inability of the patients to adhere to a medication regimen. Sometimes it is the patient who is unable or unwilling to comply with the medication regimen, and sometimes it is the family member or care giver who cannot or will not help the patient to comply with the medication regimen.

Elderly persons, in particular, often have short memories and are easily confused and therefore cannot remember to take, or having taken, medication. This can result in overdosage or failure to take medication, leading to serious health complications and possibly even death.

Surveys taken by the assignee of this invention have developed a number of desires expressed by elderly persons. They want their medication dispensed in containers which are easy to open and which clearly identify the type and purpose of the medication in terms they can understand. In many instances, descriptions of medications are difficult to read and pronounce (they are often expressed in chemical and/or medical terminology unfamiliar to most lay persons). The containers for such medications are too often difficult to open, particularly by persons with physical limitations such as arthritic hands. Therefore, a system whereby medication is identified by a unique number would aid elderly and handicapped persons in understanding their medication needs and schedule, particularly where the person is taking multiple drugs, and a system which dispenses medication in easily opened containers would greatly aid persons with even minor physical limitations.

Families and visiting nurses who care for elderly or handicapped patients in the home also need the same or similar types of help in managing the patient's medication regimen. Additionally, administrators and staff members of community-based institutions need help in administering medication appropriately to residents and to prevent abuse of drugs by staff and residents. In community-based institutions and in some nursing homes, staff responsibility for medication is increasing and with that responsibility is increased liability on the part of the staff.

In family homes, group homes and foster homes, there is a continuing problem of control of medication for a plurality of residents. Presently available storage systems, containers, and recording methods have often resulted in a patient taking someone else's medication or taking to little or too much medication. Ordinarily, where a care giver or staff member is responsible for the medication regimen of an elderly or handicapped person, that staff member or care giver does not have the time, or perhaps the capability, of creating a system that will properly control the medication regimens of all the patients for whom they are responsible. Additionally, if the patient is responsible for his or her own medication regimen, that patient is often not capable of complying with proper dosage and proper instructions because of the patient's physical and/or mental limitations.

Another problem associated with any medication regimen, particularly a prolonged one, is the possibility of dangerous interaction complications resulting from multiple medications. Today's drugs may be very effective but, because they are also very potent, they can be toxic if used improperly. Because patients are often under the care of several doctors or because doctors are uninformed or overworked, patients may have drugs prescribed for them which interact adversely with other drugs which they are taking. Additionally, many medications have side effects which are not noticed by the patient because of his or her physical and mental limitations and are not noticed by the caregiver because of lack of time, attention, or knowledge of those side effects.

To monitor and detect possible side effects of medications and possible adverse interaction of multiple medications, any system for controlling the medication regimen of the elderly and the handicapped should lend itself to computer control, whereby certain combinations of medication codes, for example, can be automatically detected and a warning immediately given. Unfortunately, most of the medications presently dispersed to the elderly and handicapped are not dispensed under control and monitoring of a sophisticated computerized system.

In acute care facilities, such as in-patient hospitals and some nursing homes, there are sophisticated drug distribution systems, record keeping systems and drug therapy monitoring. Where the facility receives federal funding, the Federal Government itself mandates pharmacists' review of the drug regimen. However, in home care, where many patients are often using multiple drugs, there are no regulations for drug distribution or control methods to assure that the drugs will be used appropriately. This lack of supervision of medication regimens can result in failure to take medicine properly or to complications resulting from side effects of individual drugs or interaction of concurrently used drugs.

Even in sophisticated nursing homes, a problem is presented when an elderly or handicapped person leaves the nursing home for a visit with family or friends. This "leave of absence" for nursing home patients requires a method of dispensing medication to the absent patient in such a manner that the patient or the temporary caregiver will have sufficient control over the medication regimen while the patient is away from the nursing home.

Similar problems also exist in the medication regimen of young children who, for the greater part of the day, are in the care of teachers or day care staff. These caregivers also have the responsibility of seeing that children receive required medication during the day and, in many instances, such responsibility may be overburdensome, particularly where the child himself is not capable of complying with the proper dosages and proper instructions.

Accordingly, there is a substantial need for a control method and system providing easy and consistent management of medications, particularly those medications prescribed and used by the various types of patients discussed above. Such a control method and system will present dosages of medicine in a manner making t easy for the patient to take proper amounts at the proper time and in compliance with the instructions relating to the medicine, and will also have the capability to monitor and detect in advance any potential interaction between multiple medications given to a patient, as well as any side effects which the patient might encounter from specified medications.

SUMMARY OF THE INVENTION

The present invention discloses a method, system and related apparatus and articles for use in dispensing medication. Control of the medication is accomplished by assigning unique numerical (or alphanumerical) code identifications to each of the many medications prescribed for patient use. A typical dosage, usually a unit dosage, of each medication is placed in a sealed packet and each packet is marked with the code identification of the medication contained in the packet.

The apparatus includes a set of individual envelopes which are produced in continuous web form, similar to multi-part business forms, and which can be processed through computer controlled printers to record thereon information unique to the individual patient, his medication(s) and their intended usage. For each patient handled by this system there is a daily set of envelopes, usually four in number, corresponding to the number of times per day that the patient is to take medication. The envelopes in a set are joined together along perforation lines or the like in a manner allowing each envelope to be easily separated from the set at the appropriate time. Each envelope is of a size sufficient to contain one or more packets which carry a single prescribed dosage of a medicine, or in the case of generic or non-prescription medicines simply a single dose thereof for that patient. Preferably the envelopes are constructed of an opaque (e.g. envelope weight paper) front ply and a transparent rear ply which may be a stretchable plastic material (similar to that used for stretch-wrap packages), or a rear ply having a large transparent window for each encelope whereby visual inspection of all contents of the envelope is assured.

The system is particularly suitable for use with a computer and a printer controlled/driven thereby to print the desired information on each envelope while still part of the continuous prepared web. A suitable software program can be provided to store the prescribed medication information for each patient, and the connected envelopes in web form, each with their interior pocket opening to a side of the web for loading, if desired, with the envelopes still in that form, make feasible the task of preparing, organizing and packaging medication for a large number of pastients in a relatively short time. Using such a system, it is easy to add to the software certain checks and controls (flags) to detect any potential adverse interaction between multiple drugs whose unique code identifications appear in the software "orders" for the same patient. Similarly, it is possible to detect potential dangerous side effects (as due to an allergic reaction) resulting from particular drugs being inadvertently prescribed for that particular patient.

Each envelope is marked with the patient's name, an identification code or codes unique to each medication included in the envelope, the dosage enclosed and each envelope is also marked, as by a color code, to indicate the time of day the medication doses in that envelope should be taken, along with any special instructions for the particular patient to follow at the time of taking the medication(s) in the envelope.

Patients and/or care givers can be provided with a listing of the medicine code numbers along with the medical and generic/common names of the medications, which may be more understandable to some. The envelopes can thus be visually checked and verified by a professional staff member at the time the envelopes are ready for distribution to the patients, they can also later be visually checked by the patient and/or his care giver. The individual envelopes are easy to open, and the single dosage for the time of day corresponding to the individual envelope is all the patient or caregiver needs to handle at any given time. A set of the prepared envelopes can be sent with children to school, with the out-patient or the nursing home resident who is going off premises on a visit. The same visual check is available to all concerned with the patient, right up to the moment the medication dosage is consumed.

The system also provides a dispensing check list used with the envelopes. The list containes entry areas for the code identifications of each medication to be given to the designated patient aligned with sets of code entry areas (e.g. blocks) corresponding to the number of dosage times per day, there being enough sets of areas for each day of a suitable period, such as a week or month. A mark is placed in a verification entry area by the patient or his care giver as each dosage of medication is administered.

Each series of envelopes in this system represents a day's supply of medication. The envelopes are broken into morning, noon, evening and bedtime dosage times, each time identified by the color of that particular envelope. More envelopes may be provided if a patient has more than four dosage times. Within each of the envelopes are medications that have been packaged as unit doses and, on the body of the envelope, information is provided as to the type of medication, the time the medication must be taken and the particular instructions for that medication. The envelopes can be separately manually and therefore, a patient may take one envelope at a time or a day's supply. The patient or the caregiver of the patient may look through the envelope to make sure that the packets of medication inside are the same as those identified on the outside of the envelope, thus making sure that the proper medication is taken at the proper time. As the envelopes are color-coded, the patient or caregiver will be able to easily determine when the medication should be taken.

Preferably, a check list is provided with this system so that, for each day of the month, the patient or caregiver can mark when a medication was taken in order to cross-check and properly control the medication regimen.

The object of this invention is to provide for a patient or care giver of a patient an easily managed system for controlling the medication regimen of the patient so that the patient is in compliance with the dosage amounts of medication and the manner in which the medication is to be taken.

Other objects and advantages of this invention will be apparent from the following description, the accompanying drawings and the appended claims.

BRIEF DESCRIPTION OF THE DRAWINGS

FIG. 1 is a view of a typical computer controlled printing system used to complete prescription orders for patients, to which the present invention is particularly applicable;

FIG. 2 is an enlarged perspective view of a series or set of envelopes showing that each individual envelope may be manually separated from the set;

FIG. 3 is a top view of a set of the envelopes showing the transparent portions of each envelope through which the dosage packet(s) may be viewed;

FIG. 5 is a top view of the front of a single envelope showing the display of coded information;

FIG. 6 is a top view of a label of a medication packet showing a display of coded information on the label;

FIG. 7 is a perspective view of a check list used with corresponding sets of envelopes; and FIG. 8 is a schematic side view showing a typical assembly of a transparent web being assembled to a main paper stock web during the manufacturing of the preferred form of envelope sets.

DETAILED DESCRIPTION OF THE PREFERRED EMBODIMENT

Figure 4:
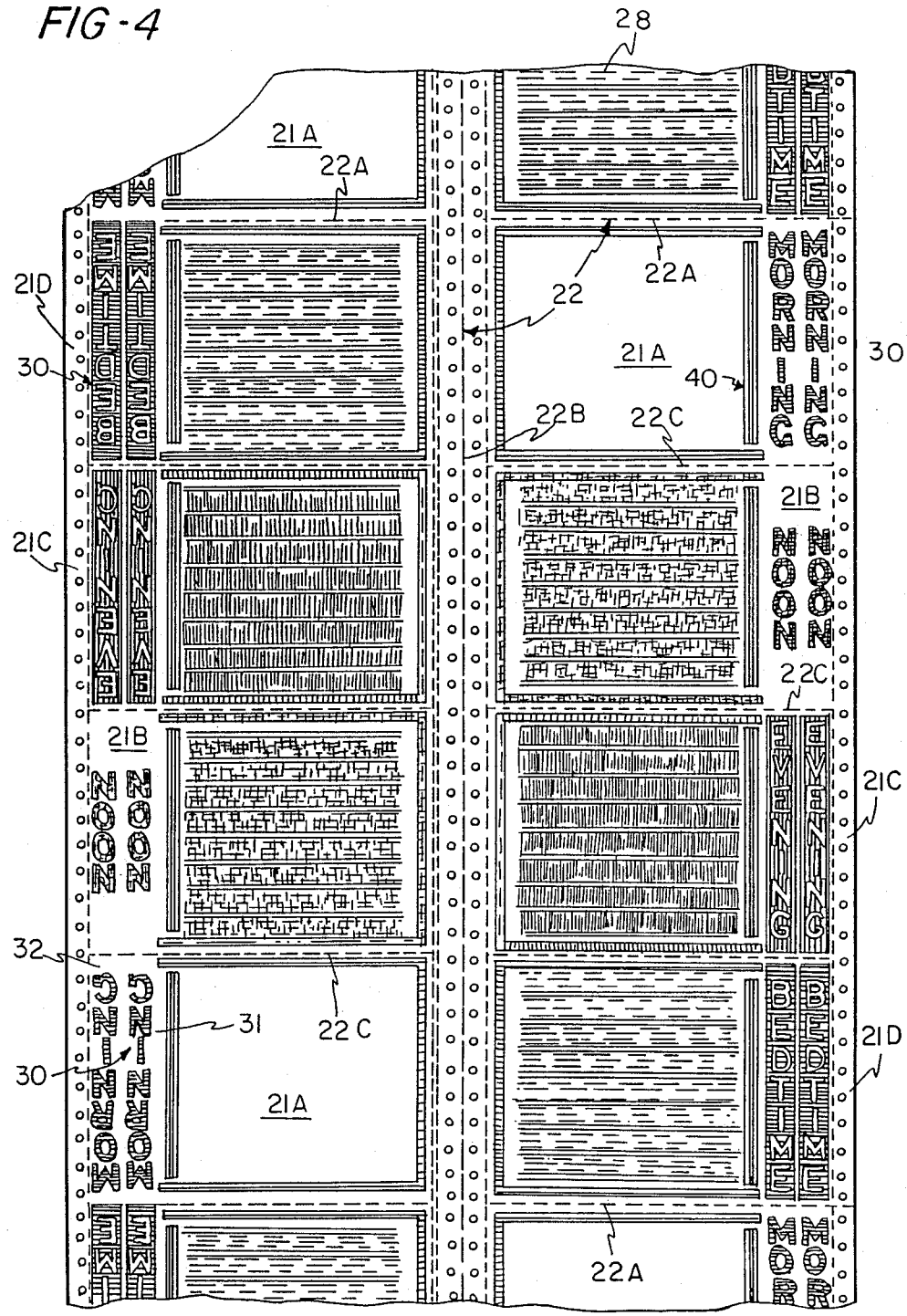
FIG. 4 is a front view of a set of envelopes showing the display of information on each envelope and the color of each envelope.

The system provided by the invention incorporates both a novel method of controlled medication dispensing and record keeping, and articles including novel envelope sets which are employed in the practice of the method. As mentioned, pharmaceutical and/or chemical names for medications, and instructions written by a physician for a pharmacist in their unique style of notation, are generally meaningless or undecipherable to the ordinary layman. One of the first features of the present system is to assign code identification, preferrably code numbers to each of the many medications which are prescribed in for patients with various illnesses. This of course is a large listing so only a small portion of it is stated here, for purposes of example. It will be understood by persons skilled in this art that such a list may in fact incorporate several thousand medicines, but this is well within the capacity of typical present day microcomputers or mini-computers, for example such as the IBM 36 models, TI Model 990, or the recently introduced IBM PS/2.

List of Drugs and codes therefor:

| | |
|---|---|
| Motrin | 09-0742 |
| Lanoxin 0.25 mg | 00-1108 |
| Tagamet 300 mg | 30-3149 |
| Carafat 1 gm | 17-1249 |
| Atavan 1 mg | 08-0641 |
| Septra DS | 04-1053 |
| Diphenhydramine HCl 50 mg | 05-4025 |
| Diphenoxylate/atrupine | 30-0179 |
| Carbamazepine 200 mg | 12-3301 |
| Dietheylstilbestrol 1 mg | 01-5458 |
| Dimenhydrinate 50 mg | 12-3901 |
| Hydroxyzine HCl 25 mg | 01-4640 |

Information about the patients being monitored by the system is also entered into the computer, normally the usual medical history of the patient including the illness for which he is presently under treatment with prescribed medicines, and any history of past illnesses and medications taken for them, and any known reactions or difficulties encountered in taking any particular medication. This information includes for each patient the present medication(s) prescribed, and the recommended dosage thereof.

Referring to FIG. 1, the computer 10 drives a printer 12 which is supplied with a special continuous form having unique envelope sets (later described in detail) which are attached to each other as part of the continuous forms, and the sets of which can be separated at the appropriate time from the continuous form as connected but separable sets of envelopes (most commonly four). These sets are designed to contain all the medication of a single patient for a single day, divided into the separate envelopes by dosages of the one or more medicines that patient is to take at a particular time of the day. Thus, at the beginning of the day, for example, the patient or his care giver can receive a set of previously prepared, printed, filled and sealed, connected envelopes with contained medications, and at each appointed time of the day, the appropriate envelope is preferably removed from the set, but in any event opened, and the patient takes or is given the medication(s) contained in that single envelope.

In most instances the medicine (especially prescription drugs) is contained within a separate packet for each medication, placed in each of the appropriate ones of the envelopes in the set, and provided with a label which identifies the medication by the above-described numerical code, and perhaps other information about that medication as may be helpful or even required, as illustrated by way of example in FIG. 6.

On the face of the envelopes (FIG. 4) this identification code is printed under computer control along with the patient's name, the day and date, and any instructions as to administration of the medication. In addition, information required by Federal, State, or other governing body regulations is also printed on each envelope by the computer. It should be noted that it is also possible to enter code information in Braille or the like for the sight-impaired. The envelopes are all constructed with a transparent member as one of the plies of the envelope, or at least with a transparent window occupying a major area of one surface of the envelope, thereby allowing visual inspection of the labelling on the enclosed packets and comparison of the medication code number(s) with the number or numbers printed on the envelope. This feature allows a visual check for correct type of medication at the time of dispensation and again by the patient and/or his care giver.

To assist in distinguishing the envelopes, for example in the event they become detached prematurely, each envelope in a set is predominantly color coded. A scheme successfully used in an actual embodiment of the invention, wherein four envelopes per day are supplied, uses white for the morning envelope, yellow for the noon envelope, pink for the evening envelope, and blue for the bedtime envelope. These envelopes have been formed of twenty-four pound bond paper web P, printed front and rear as shown in the drawings to designate locations of various information added by the computer printer, and having joined to the reverse side of the web P, at selected ares as later described, a transparent web T which may be a 0.003 inch thick clear polyvinyl film. Preferably the joints between the webs are three-sided to define an open-mouthed shape to each envelope.

Thus, the system provides the necessary supply for each day, divided according to directions for administering to the patient. The envelope sets can easily be provided in quantity for someone who can be trusted, or their care giver trusted, to use only one set per day. Obviouly it would be quite difficult to cause confusion if the envelopes are properly removed from the sets, one at a time, as needed. The ability of the patient to make a self-check for accuracy of medication type is a confidence builder, and is one of the features which was requested by most patients in the abovementioned survey.

As shown in FIGS. 2 and 3, a set 20 of envelopes 21 is joined along separation lines 22, which may be discontinuous perforations of known type. Each envelope 21 has a designation of the time of day, as shown in FIG. 5 wherein a single separated envelope is illustrated in greater detail. The envelopes 21 are color-coded so each dosage time may be distinguished from the other. For example, as shown in Fig. 4, in addition to the large lettered "time of day" information, the morning dosage envelope 21A is white, the noon envelope 21B is yellow, the evening envelope 21C is pink and the bedtime dosage envelope 21D is blue.

The medication of the patient is preferably enclosed in a sealed packet 24 (see FIG. 3), each packet containing a unit dosage. The packets 24 are put in the envelopes through the open mouth 25 on the transparent back 26 of each envelope 21, as shown in FIG. 2. Alternately, the opening may consist of a zip-lock type opening or any other type opening which may be easily and quickly managed.

The opaque front 28 of the envelope 21, as shown in FIG. 4, has a flap 30 on which the time of the day is printed twice, once on the inner portion 31 and once on the outer portion 32 of the flap 30. The underside 34 of the outer portion 32 of the flap 30 has an adhesive strip 36 which is covered by a protective strip 38, which may be applied over the adhesive strip in known manner. After the packets 24 of medication are placed in the envelopes 21, the strip 38 is peeled from the outer portion 32 of the flap 30, as shown in FIG. 3, and the flap 30 is folded over to seal the open mouth 24 of the envelope 21, as shown in FIG. 2.

The front 28 of each envelope 21 may have an opening 40, formed for example as a line of discontinuous perforations, and indicated by a zipper symbol printed thereon, which can be easily opened by the patient or the caregiver of the patient in order to remove the packets 24 of medication. This opening 40 may also be a zip-lock type opening or any other type opening which may be easily managed by a person with physical limitations, particularly of the hands and/or fingers.

The envelopes 21 can be produced as a continuous form, two across, with each of the envelopes and the sets thereof laid out, for example, as shown in FIG. 4. The envelopes 21 are divided by perforations 22, as shown in FIGS. 3 and 4. The major perforation lines 22A separate the web into sets of four envelopes which may be labelled "MORNING, NOON, EVENING and BEDTIME" as shown in FIG. 4. The major vertical or lengthwise separation line 22B separates the two sets across from each other on the web. The minor separation lines 22C separate the individual envelopes in a set. As shown in FIG. 8, in producing the envelopes 21, a first printed web of sheet material 44 is brought together with a second web of material 46. Both webs are flexible and the second web 46 has regularly spaced transparent portions so that the second web 46 adheres to the U-shaped adhesive strip 42 which has been applied to three sides of each envelope in the first web 44, as shown in Fig. 2. After the webs are joined, each envelope 10 has a transparent back portion 48, as shown in FIGS. 2 & 3.

Figure 7:
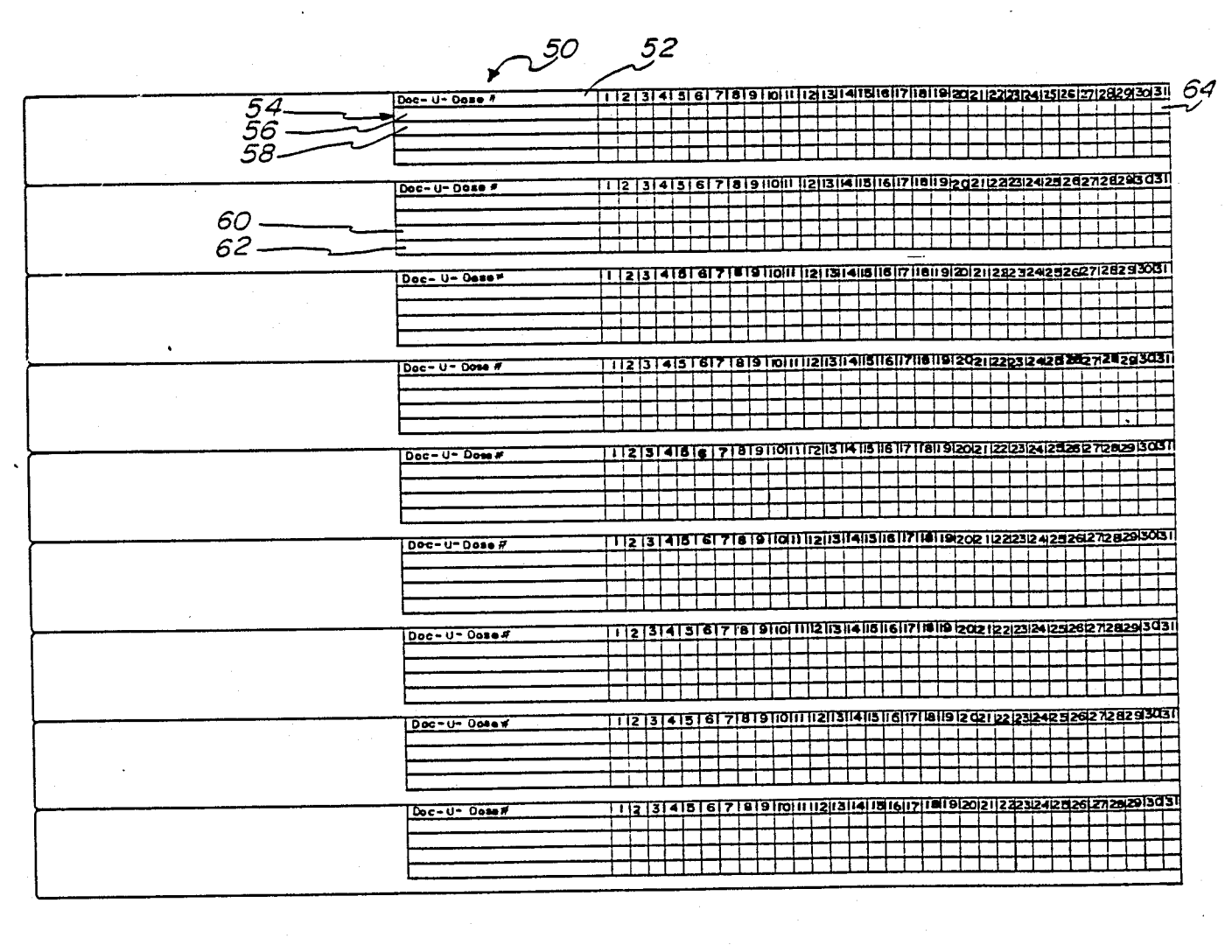

As shown in FIG. 7, a checklist or medicine calendar 50 has entries for each medication of the patient. A space 52 is provided for the code number and entry areas 54 are provided below the code number 52 to record the dosage for each time of the day. Each entry area 54 will be a different color to distinguish the times of the day. For example, as shown in FIG. 6, a white area 56 for morning, a yellow area 58 for noon, a pink area 60 for evening and a blue 62 for bedtime. There are 31 verification areas 64 corresponding to each entry area 54 so that this checklist can be used to check the medication regimen for a whole month for each patient. The packets 24 may be used for liquid or solid medication, i.e. capsules or tablets. Additionally, other medications such as ointments or lotions may be placed in the envelope for use at particular times of the day. Preferably, the medications will be prepackaged in a series of envelopes which will be dispensed by a pharmacy. In one embodiment, the envelopes will be packaged in a cardboard tote, e.g. a simple box preferrably with a carrying handle and appropriate printed information on the tote's exteriior, containing a month's supply. This tote can be collapsible for storage and can be refilled each month with the series of envelopes for that month.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A medicine dispensing aid for dispensing by a pharmacy of labelled packets of medication, comprising a set of related individual envelopes joined together along separation lines which permit manual separation of the envelopes, one at a time, from the set;

a plurality of packets for enclosing medication to be dispensed to a patient according to a predetermined time and dosage schedule, said packets having indicia thereon providing identification of the medication contained within the packet;

said envelopes containing one or more of said packets of medication to be given to a patient at a designated time at which the envelopes are to be opened;

each of the envelopes in the set having a unique marking distinguishing it from the other envelopes in the set;

each of the envelopes in the set having a visible data entry area on which is entered at least information identifying the patient and identification of medication enclosed in whichever of said packets are placed within the envelope; and each of said envelopes having a transparent area separate from said data entry area through which identification of medication enclosed in that envelope can be viewed and verified against the information entered on said data entry area of the envelope.

2. A medicine dispensing system as defined in claim 1, wherein said separation lines are perforation lines demarking the joints between adjacent envelopes to allow each individual envelope to be separated from the set, said marking including a distinct and different color code appearing on each envelope to distinguish it from the other envelopes in the set and to identify the time of day when the dosage of medication therein is to be administered.

3. A medicine dispensing system as defined in claim 2, wherein said data entry areas of the envelopes being aligned such that information can be imprinted thereon by an automated printer.

4. A medicine dispensing aid comprising, a first flexible web of sheet material, a second flexible web of sheet material having at least regularly spaced portions lengthwise of said second web which are transparent for viewing of contents of envelopes formed from said webs, at least one of said webs having marginal feed holes extending lengthwise thereof, means defining major perforate divisions transverse of said webs to define sets of envelopes, means defining minor perforate divisions at least transverse of said webs defining individual envelopes within each set, means joining said first and second webs along generally U-shaped paths which follow the directions of said minor perforate divisions and which join said webs along three sides of the individual envelopes and leave an open end of the resultant envelope extending lengthwise of said webs and opening toward the margin of the webs whereby one or more dosages of medication can be loaded into said envelopes while said envelopes are still joined as sets, flaps formed of portions of said first web extending along said open ends of said envelopes for closing the same, said envelopes being of a size to contain one or more packets of medication to be given to a patient at a designated dosage time, each of the envelopes in a set having an exterior area on said first web onto which can be entered code information extending transversely of said webs and identifying medication enclosed in a packet placed within the envelope prior to separation of the sets from other sets in the continuous web.

5. A medication dispensing system as defined in claim 4, wherein said second flexible web is a transparent stretchable material which can tightly surround packets of medication placed therein to make identification markings on the packet clearly visible for inspection of code numbers thereon and comparison with corresponding code numbers entered on said envelopes.

6. A medication dispensing system as defined in claim 4, wherein said marking on each envelope of said sets is a color coded mark identifying the time of day when the enclosed medication is to be taken by the patient.

7. A medication dispensing system as defined in claim 4, wherein said envelope includes a slit-like initially closed entry line which can be easily separated to give access to medication in the envelope.

8. A medication dispensing system as defined in claim 4, wherein said sets of envelopes are arranged on said continuous web for passage through a printer to allow automated entry of printed information into the data entry area on each envelope.

* * * * *